Aug. 9, 1955             C. M. HINES             2,715,049
SAFETY CONTROL APPARATUS FOR MULTIPLE UNIT LOCOMOTIVES
Filed July 27, 1951             2 Sheets-Sheet 1
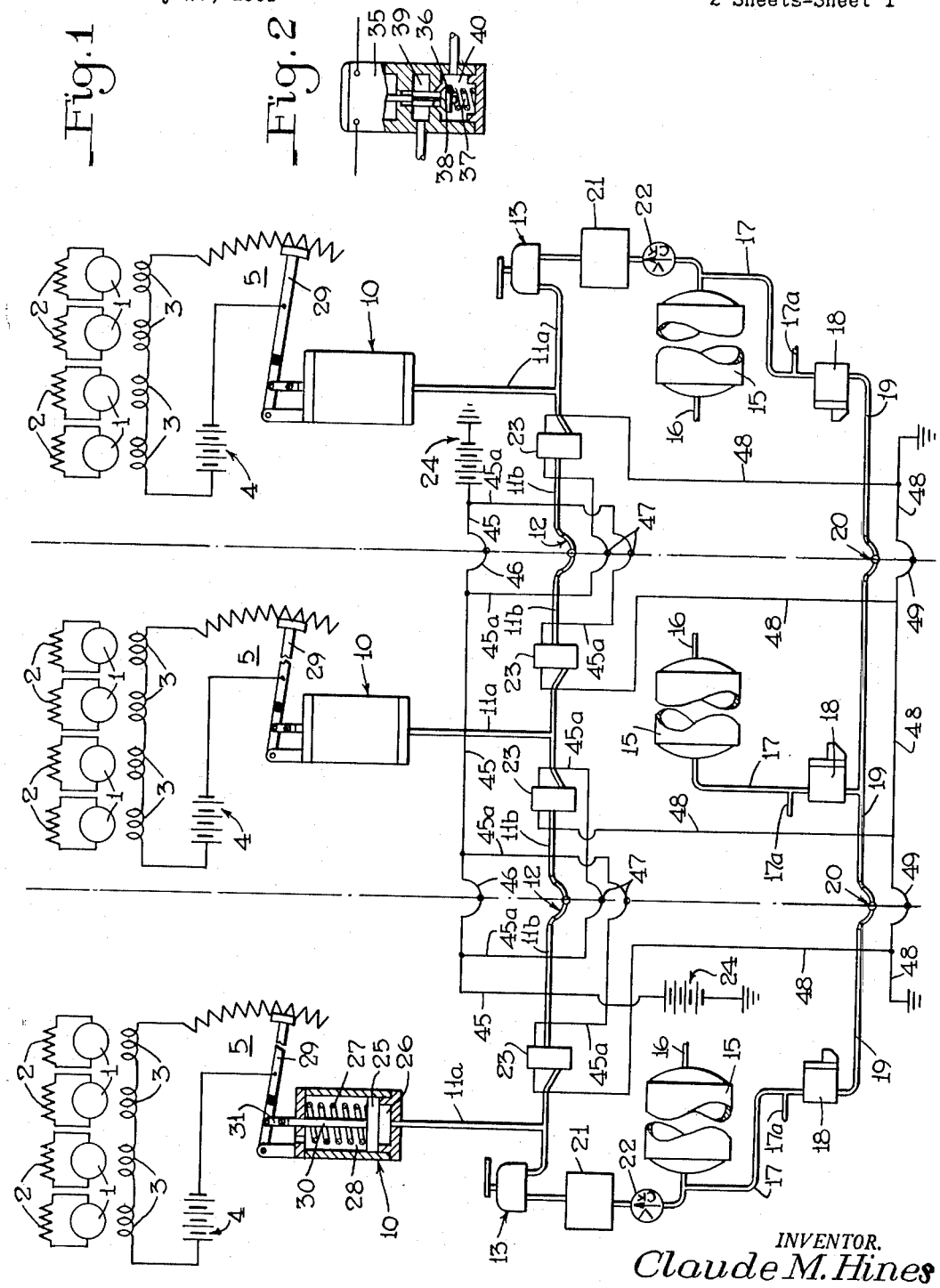
INVENTOR.
Claude M. Hines
BY
Frank E. Miller,
ATTORNEY

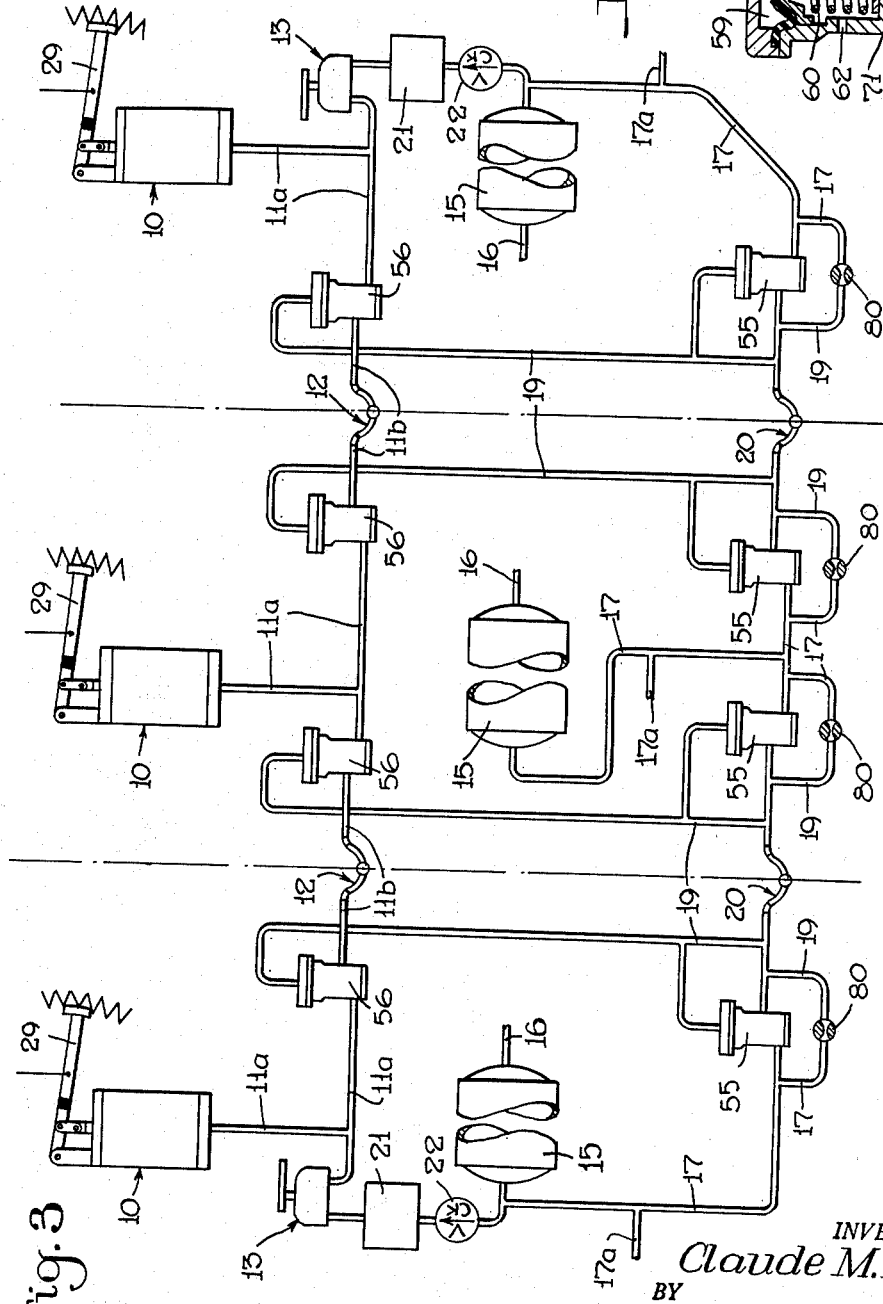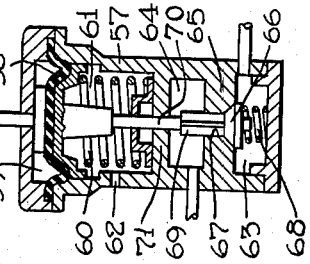

United States Patent Office 2,715,049
Patented Aug. 9, 1955

2,715,049

SAFETY CONTROL APPARATUS FOR MULTIPLE UNIT LOCOMOTIVES

Claude M. Hines, Verona, Pa., assignor to Westinghouse Air Brake Company, Wilmerding, Pa., a corporation of Pennsylvania Application July 27, 1951, Serial No. 238,965

4 Claims. (Cl. 303—1)

This invention relates to safety control apparatus for multiple unit locomotives, particularly of the Diesel-electric type.

It is a prime object of the invention to assure fluid pressure control of dynamic braking on the units of a multiple-unit Diesel-electric locomotive in event of accidental separation of such units.

It is another object of the invention to prevent loss of fluid under pressure from the main reservoir on each unit of a multiple-unit Diesel-electric locomotive in event of accidental separation of locomotive units.

Other objects and advantages will become apparent from the following description taken in connection with the accompanying drawings, in which:

Fig. 1 is a schematic representation of a fluid pressure dynamic braking control system for a multiple-unit Diesel-electric locomotive and embodying the invention;

Fig. 2 is a schematic representation showing, in cross-section, details of a magnet valve device, several of which are employed in the apparatus shown in Fig. 1;

Fig. 3 is a schematic representation of a fluid pressure dynamic braking control system for a multiple-unit Diesel-electric locomotive and embodying an alternate form of the invention; and Fig. 4 is a schematic representation showing, in cross-section, details of a relay valve device, a plurality of which are employed in the apparatus shown in Fig. 3.

Description

Referring to Fig. 1, the dynamic braking equipment with which the invention is associated may comprise, for sake of schematic illustration, four traction motors on each of the locomotive units; three units, for example, being shown in the drawing, separated by a dot-and-dash line to indicate divisibility of the units. Each of the traction motors comprises an armature 1, which, when the motors are connected to act as generators for dynamic braking, will be connected as they are shown in the drawing to a load such as a fixed resistor 2. Each of the traction motors also comprises the usual field coil 3 energization of which determines the dynamic braking current generated by rotation of the armature 1 at any given speed, hence the degree of dynamic braking of the particular traction motor. The respective field coils 3 of the four traction motors on each locomotive unit are connected in series, and, for sake of schematic representation, may be availed of as a source of electrical energy from such as a battery 4 on each unit. For controlling the amount of current which will be supplied to the series field coils 3, a dynamic brake control rheostat 5 on each unit is connected in a series circuit through the respective battery 4 and respective series field coils 3. In practice, the main generator (not shown) on each locomotive unit being driven by Diesel engines operating at idle speed may constitute the source of electrical energy for the traction motor field coils 3 during dynamic braking rather than the battery 4 chosen for simplification, and the rheostat 5 on each locomotive unit actually may control energization of the main generator field to vary energization of the respective traction motor field coils, but schematically, representation in the drawing is a simplified equivalent.

Apparatus for controlling the degree of dynamic braking on each unit of the locomotive comprises, respectively, a fluid pressure dynamic brake control actuator 10 for adjusting position of the respective dynamic brake control rheotat 5 in response to variations in pressure of fluid in a respective actuator control pipe 11a; the control pipe 11a on one locomotive unit being communicated by means of relay valve devices, pipes 11b and the usual flexible hose couplings 12 to the corresponding control pipe on the adjacent coupled locomotive unit to form a continuous control conduit for conveying fluid under pressure to and from the dynamic brake control actuators 10 on all of the coupled locomotive units in unison. The usual fluid pressure control valve device 13 mounted in the engineer's cab in the head-end locomotive unit is employed to effect the variations in pressure of fluid in the control pipe 11a communicated through the locomotive units. In the case where the tail-end unit of the locomotive also has an engineer's cab to facilitate reversal in direction of travel of the multiple unit locomotive, a similar control valve device 13 will be located in such cab for varying pressure of fluid in the control pipe 11a to control dynamic braking of the locomotive units when such tail-end unit actually becomes the head-end unit; otherwise, the device 13 in the cab of a tail-end unit will remain in a lap position closing off the respective end of the control pipe 11a.

The usual main reservoir 15 on each of the locomotive units serves as a source of fluid under pressure for operating the dynamic brake control actuators 10. Each of the reservoirs 15 is adapted to be supplied with fluid under pressure from a compressor (not shown) on the respective locomotive unit via such as a conduit 16. The reservoir 15 on each locomotive unit is connected to the reservoir on the adjacent coupled locomotive unit by way of a reservoir pipe 17, a main reservoir cut-off valve device 18, a pipe 19, and hose couplings 20 which join the respective pipes 19 one with the other between the coupled locomotive units. Such arrangement of connecting the main reservoirs 15 of all locomotive units together provides for maintenance of pressure in all main reservoirs by supply of fluid under pressure from a compressor on one of the locomotive units should a particular compressor on another of the locomotive units fail to function. The main reservoir cut-off valve device 18 on each of the locomotive units serves the usual function of cutting off communication between the respective reservoir pipes 17 and 19 to prevent accidental loss of fluid under pressure from the respective main reservoir 15 by way of a parted hose coupling 20, for example, such as might occur during collision of the locomotive.

Fluid under pressure for operating the dynamic brake control actuators 10 is stored in a volume chamber 21 which is provided on each of the control units of the multiple unit locomotive. The volume chamber 21 on each control unit communicates with the main reservoir 15 on that same unit by way of a check valve device 22 which allows fluid under pressure from such main reservoir to flow to the volume chamber but prevents flow of fluid under pressure in the opposite direction. Size of the volume chamber 21 on each control unit of the locomotive is such as will allow for a certain number of cycles of operations of the dynamic brake control actuators 10 on all locomotive units in event of loss of pressurized fluid in the main reservoirs 15.

According to the invention, on each of the control units of the locomotive there is provided a single magnet valve device 23 and, on the slave unit of the locomotive, two of such magnet valve devices 23, all of which are arranged to be energized with electrical energy from a battery 24 on the head or tail end control unit via wires coupled between the locomotive units, for the purpose of establishing communication between the several actuators 10 and the control valve device 13 and arranged to be deenergized by virtue of circuit arrangement of such wires to cut off communication between a respective dynamic brake actuator 10 and a respective hose coupling 12 upon parting of such coupling to prevent escape of actuator operating fluid via such parted coupling to assure control of dynamic braking on a locomotive unit which may become accidentally separated from the other units of the locomotive.

Each of the dynamic brake control actuators 10, for the sake of illustration, schematically, simply comprises the usual casing having a piston 25 disposed therein which is subject opposingly to pressure of fluid in a pressure chamber 26 at one side and to force of a compression spring 27 disposed in an atmospheric chamber 28 on its opposite side. The piston 25 is operatively connected to a movable contact arm 29 of the respective dynamic brake control rheostat 5 by way of such as a piston rod 30 and a link 31. The piston 25 in each actuator device 10 will respond to pressurization of the respective pressure chamber 26 to move the respective rheostat contact arm 29 in a direction to call for cutting out rheostat resistance in the respective traction motor field circuit to increase the degree of dynamic braking on the particular locomotive unit according to degree of such pressurization of said chamber 26. Conversely, de-pressurization of pressure chamber 26 will allow spring 27 to move the rheostat contact arm 29 to cut more rheostat resistance into the respective traction motor field circuit to reduce the degree of dynamic braking on that particular locomotive according to degree of such de-pressurization.

The pressure chambers 26 in the actuators 10 on the respective locomotive units are connected to the pipes 11a on such units. On the control units of the locomotive, the control valve device 13 is connected to the respective pipes 11a for effecting variations in pressure of fluid therein.

Referring to Fig. 2, the several magnet valve devices 23 are alike, and each, schematically, may comprise the usual solenoid portion 35 which, when energized, actuates a valve 36 against opposition of a spring 37 to an unseated position, in which it is shown in the drawing for establishing a communication between a chamber 39 and a chamber 40. Upon de-energization of the solenoid portion 35, the spring 37 will move the valve 36 to a seated position opposite to that in which it is shown in the drawing, closing off the chambers 39 and 40 one from the other.

In the magnet valve device 23 on the control units of the locomotive, the chamber 40 is connected to the respective pipe 11a, while the chamber 39 is connected to the respective pipe 11b. On the slave unit of the locomotive, the chambers 40 in the two magnet valve devices 23 are connected to the pipe 11a, while their chambers 39 are connected to the pipes 11b, respectively, which extend in opposite directions to the hose couplings 20 at the ends of said unit.

According to the invention, electrical energy from the battery 24, on the control unit of the locomotive, or the batteries 24 in case of a control unit at each end of the locomotive, as illustrated in Fig. 1, is made available from the positive terminal of said battery or batteries, to all units of the locomotive for energizing the magnet valve devices 23 by means of a source wire 45 connected between units by such as wire contact couplings 46. One terminal of each of the magnet valve devices 23 on a particular unit of the locomotive is connected to the source wire 45 only by way of the immediately adjacent locomotive unit through such as a wire contact coupling 47. The opposite terminal of each of the magnet valve devices is connected to the negative terminal of the battery 24 or batteries 24 by way of a ground wire 48, and branches thereof, which is made common to all units of the locomotive by way of such as wire contact couplings 49. In the control unit or units of the locomotive, the negative terminal of the battery 24 or batteries 24, respectively, may be connected to the ground wire 48 by ground connections.

*Operation of safety control apparatus shown in Fig. 1*

In operation of the safety control apparatus shown in Fig. 1, assume three locomotive units, two control and one intermediate slave, to be coupled together and that the volume chambers 21 on the control units are charged with fluid under pressure. Under such coupled condition of the three units of the locomotive, the hose couplings 12 will be coupled so that the respective pipes 11b at adjacent ends of the coupled locomotive units will be connected together; the wire contact couplings 47 will be coupled so that one terminal of each of the magnet valve devices 23 on the particular coupled units will be connected to the source wire 45 and branches 45a thereof by way of the immediately adjacent coupled locomotive unit; and the wire contact couplings 49 will be coupled so that the other terminal of the magnet valve devices 23 will be connected to the negative terminal of the battery 24 by way of the ground wire 48.

Under the above conditions, electrical energy from the positive terminal of the battery 24 or batteries 24 will flow by way of the source wire 45 and the wire contact couplings 47 to the magnet valve devices 23 to energize same. With the magnet valve devices 23 thus energized, their respective valves 36 will be in the open position shown in Fig. 2, with respective chambers 39 and 40 consequently in communication one with the other so that respective pipes 11a will be connected to the respective pipes 11b and, via couplings 12, thereby to one another.

Assume further that the control valve device 13 on the leading control unit of the multiple unit locomotive is in its release position so that the pressure chambers 26 on the dynamic brake control actuators 10 on all units will be void of fluid under pressure by virtue of venting of the connected pipes 11a via said control valve device.

With the respective pressure chambers 26 in the dynamic brake control actuators 10 thus void of fluid under pressure, the respective movable contact arms 29 of the dynamic brake control rheostats 5 on the respective locomotive units will be held in the position in which they are shown in the drawing by action of the respective springs 27 in said actuators, so that maximum rheostat resistance will be presented to the field circuits of the traction motors to call for a minimum or zero degree of dynamic braking of the locomotive.

Assume also that the control valve device 13 on the trailing control unit of the locomotive has been caused to assume its lap position to close the connected end of the respective pipe 11a so as to prevent escape of any fluid under pressure which may be supplied subsequently to the connected pipes 11a for operating actuators 10.

Now assume that while the locomotive units are coupled together, it is desired to effect dynamic braking. The engineer in the leading unit of the locomotive will operate the control valve device 13 to effect supply of fluid under pressure from chamber 21 to the pipe 11a on such unit. Fluid under pressure thus supplied to the pipe 11a on the leading unit will also flow to the corresponding pipes on the other units of the locomotive by way of the respective chambers 39, 40 in the energized magnet valve devices 23, the pipes 11b, and the hose couplings 12. Fluid under pressure thus supplied to the respective pipes 11a on all units of the locomotive will flow to the respective pressure chambers 26 in the dynamic brake control actuators 10 to cause adjustment of the respective movable contact arms 29 to call for less rheostat resistance in the respective traction motor field circuits. Thus, the respective traction motor fields 3 will become energized by flow of current from the respective batteries 4 to cause generation of a dynamic braking current and therefore braking effort for restraining movement of the locomotive according to adjustment of the rheostats 5 and hence according to the degree of pressure in the respective pressure chambers 26 in the dynamic brake control actuators 10.

Thus, it will be seen that with the several pipes 11a connected one with the other by way of the chambers 39 and 40 in the magnet valve devices 23 which are energized, and by way of the coupled hose couplings 12 variations in pressure of fluid in the pipe 11a on the leading locomotive unit may be effected by manipulation of the control valve device 13 which will be experienced substantially simultaneously in the corresponding pipes 11a on the other locomotive units to cause increase or decrease in pressure of fluid in the respective chambers 26 in the dynamic brake control actuators 10 and thereby adjust the respective dynamic brake control rheostats 5 for increasing or decreasing the degree of dynamic braking effort imposed by the traction motors to rotation of the driving wheels on all units of the locomotive.

Now assume that while all units of the locomotive are coupled together it happens by accident that one of the units of the locomotive, the leading unit for example, becomes separated from the other locomotive units.

Under such circumstances, the hose coupling 20, formerly establishing connection between the pipe 19 on the leading unit and the corresponding pipe on the intermediate slave unit, becomes uncoupled or ruptured so that such connection no longer is established and both of said pipes become vented to atmosphere at the separated coupling. Such venting of fluid under pressure from the pipe 19 on the intermediate unit of the locomotive will also vent the corresponding pipe 19 on the trailing unit of the locomotive by way of the hose coupling 20 remaining coupled. With the pipes 19 on all three locomotive units thus vented, the respective main reservoir cut-off valve devices 18 on such units will respond to such venting to disconnect the respective pipes 17 from the now vented pipes 19 and thereby prevent accidental loss of fluid under pressure from the main reservoir 15 on each unit.

With the leading unit of the locomotive separated from the other locomotive units, as assumed, the hose coupling 12 formerly establishing connection between the pipe 11b on the leading locomotive unit and the corresponding pipe 11b on the slave unit of the locomotive will become separated or ruptured and thereby disestablish such connection and vent these two pipes 11b to the atmosphere. At the same time, separation of the aforementioned locomotive units will part the respective wire contact couplings 46, 47 and 49.

Parting of the wire contact coupling 46 between leading and slave units disconnects the battery 24 on the leading unit from the source wire 45 on the slave unit of the locomotive, which wire will remain availed of electrical energy from the battery 24 on the trailing control unit of the locomotive by way of the respective wire contact coupling 46 which remains intact.

Parting of the two wire couplings 47 disconnects corresponding terminals of the magnet valve devices 23 at adjacent ends of the leading and slave units, respectively, from the source wires on the slave and leading units, respectively, and causes deenergization of these two magnet valve devices which therefore respond to close their respective valves 36 and disestablish communication between the corresponding pipes 11a and the now vented pipe 11b on the above-named locomotive units to prevent undesired venting of these pipes 11a by way of the separated hose coupling 12.

Thus it will be seen that according to the prime object of the invention, with the magnet valve device 23 on the leading unit of the locomotive, which has become separated from the other locomotive units, closing off the pipe 11a from the pipe 11b vented via the separated hose coupling 12, the pipe 11a persists to be capable of conveying and retaining pressure fluid supplied to the pressure chamber 26 in the dynamic brake control actuator 10 on the leading locomotive unit so that dynamic braking on the separated leading unit of the locomotive may be effected and controlled by the engineer on such unit by manipulation of the respective control valve device 13. If for any reason pressure fluid in the main reservoir 15 on the separated leading locomotive unit becomes lost, sufficient volume of pressure fluid will be retained in the volume chamber 21 by the check valve 22 to allow for a sufficient number of cycles of operation of the dynamic brake control actuator 10 to safely keep the separated locomotive unit under control.

Correspondingly, on the remaining units of the locomotive, that is, the formerly intermediate slave unit and the trailing unit of the locomotive, dynamic braking control will remain intact by virtue of the deenergized magnet valve device 23 at the leading end of the slave unit which closes off the pipe 11b from atmosphere by way of the separated hose coupling 12 at that end and by virtue of the communications persisting between the two pipes 11a on these units by way of the intact coupling 12, the pipes 11b at adjacent coupled ends of the two units, and the communications established between these pipes 11a and 11b by the corresponding magnet valve devices 23 at such adjacent coupled ends which remain energized by virtue of the electrical circuit persisting between the positive and negative terminals of the battery 24 on the trailing control unit through the wires 45, 45a, 48 and the intact wire couplings 46, 47, 48, 49, as will be appreciated from previous description.

Therefore, assuming an operator to be present in the cab of the trailing control unit of the locomotive at the time the leading control unit becomes separated from the slave unit, in view of the above, such an operator may effect and control dynamic brake application by manipulation of the control valve device 13 on said trailing control unit to effect substantially simultaneous supply of fluid under pressure to the pipes 11a on both the slave unit and the trailing control unit to operate the dynamic brake control actuators 10 on the two units.

Thus, it will be seen also that posing the case that both the leading control unit remained coupled to the slave unit and the two units became separated from the trailing control unit, by virtue of similarity of the two control units and symmetry of the double control end multiple unit locomotive, the situation is similar to that described in the preceding paragraphs with control of dynamic braking remaining intact on the separated leading control and slave units, which would be analogous to the separated slave and trailing control units formerly described, and remaining intact on the separated trailing control unit, which would be analogous of the separated leading control unit formerly described.

Descripition of embodiment of safety control apparatus shown in Fig. 3

Referring to Fig. 3, another embodiment of the invention is shown for assuring that control of dynamic braking on various units of a multiple unit Diesel electric locomotive will remain intact in event of accidental separation of locomotive units. In the drawing, a leading and a trailing control unit with intermediate slave unit are shown coupled together with divisibility indicated schematically by dot-and-dash lines. Both units comprise the following elements or devices which, for sake of brevity, will bear the same reference numerals employed to designate like parts in the equipment illustrated in Fig. 1:

Both the control and slave units of the locomotive comprise the usual main reservoir 15 adapted to receive fluid under pressure from such as the compressor (not shown) via such as the supply pipe 16 and to deliver fluid under pressure stored therein to the usual fluid pressure brake system via a branch 17a of delivery pipe 17. On the control unit of the locomotive, such pipe 17 also delivers fluid under pressure from the respective main reservoir 15 on such unit to the volume chamber 21 via the check valve 22 which assures availability of a sufficient quantity of fluid under pressure for delivery to pipe 11a for operating the dynamic brake control actuators 10 by manipulation of the control valve device 13 in event of loss of pressurized fluid in the main resservoir 15.

In lieu of the main reservoir cut-off valve devices 18 in the apparatus shown in Fig. 1, the apparatus of Fig. 3 employs relay air valve devices 55 at each coupled end of each locomotive unit which control communication between the pipes 17, hence the main reservoirs 15 on the units, and the pipes 19, hence the hose couplings 20 connected between such units when coupled together.

In lieu of the magnet valve devices 23 in the apparatus shown in Fig. 1, the apparatus shown in Fig. 3 employs relay valve devices 56 at each coupled end of each locomotive unit which control communication between the pipes 11a, hence the dynamic brake control actuators 10, and the pipes 11b, hence the hose couplings 12 extending between the coupled locomotive units.

Schematically, both the relay valve devices 55 and the relay valve devices 56 may be alike, and, for sake of illustration, referring to Fig. 4, each may comprise a casing 57 having disposed therein a resilient diaphragm 58 which is subject opposingly to pressure of fluid in a control chamber 59 at one side and to force of a compression control spring 60 disposed in a chamber 61 at its opposite side, which latter chamber is constantly open to atmosphere by way of a port 62 in the casing 57. Also formed in the casing is an inlet chamber 63 and an outlet chamber 64 separated one from the other by a partition 65. A valve 66 is disposed in the chamber 63 for controlling communication through a central bore 67 extending through the partition 65. A tapered seat is formed in the partition 65 encircling one end of the bore 67 to accommodate seating engagement of the valve 66 which is urged toward such engagement by a compression spring 68 disposed in chamber 63. The valve 66 is attached to one end of a fluted stem 69 slidably guided by the wall of the bore 67 and projecting into the outlet chamber 64. A valve push rod 70 operably connected at one end for movement by deflection of the diaphragm 58 in the direction of chamber 61 extends through chamber 61 and a suitable opening in a partition 71 separating chambers 61 and 64 into abutting relationship with the end of the fluted stem 69 so that such movement will overcome action of spring 68 and unseat valve 66.

Each of the relay valve devices 55 and 56 will respond to attainment of a certain pressure of fluid in its control chamber 59 to deflect diaphragm 58 against opposition of springs 60, 68 in the direction of chamber 61, causing unseating of valve 66 and thus opening of the inlet chamber 63 to the outlet chamber 64, and each will respond to reduction in pressure of fluid in its control chamber 59 to allow springs 60 and 68 to return the diaphragm 58 to its repose position and the valve 66 to its seated position, in which positions the diaphragm and valve are shown in the drawing, to again close off the outlet chamber 64 from the inlet chamber 63.

In the embodiment of the invention shown in Fig. 3, the relay valve devices 55 are located at the coupled ends of the locomotive units with their respective outlet chambers 64 and control chambers 59 connected to the pipes 19 leading to the hose couplings 20 at such ends, while their respective inlet chambers 63 are connected to the pipes 17 and thereby to the respective main reservoirs 15 on such units. The relay valve devices 56 are located also at the coupled ends of the locomotive units with their respective control chambers 59 connected in common with the control chambers of the corresponding relay valve devices 55 via branches of the respective pipes 19, their outlet chambers 64 are connected to the pipes 11b at such coupled ends leading to couplings 12, and their respective inlet chambers 63 are connected to the respective pipes 11a leading to the dynamic brake control actuators 10 on such units.

By-passing each of the relay valve devices 55 there is provided a choke 80 which constantly establishes restricted communication between the respective pipe 17 and the respective pipe 19.

*Operation of embodiment of safety control apparatus shown in Fig. 3*

In operation of the embodiment shown in Fig. 3, assume that the various units of the locomotive are coupled together, with the hose couplings 12 and 20 extending between the leading control unit and the slave unit coupled and intact, and the corresponding couplings 12 and 20 extending between the slave unit and the trailing control unit coupled and intact. Assume also, that the control valve device 13 on the trailing control unit is in its lap position with the pipe 11a on such unit thereby closed off to atmosphere, and assume that the corresponding control valve device 13 on the leading control unit is in its release position, with the corresponding pipe 11a on such unit consequently thereby vented to atmosphere, and, further assume that the main reservoirs 15 on all locomotive units are charged with fluid under pressure.

On each locomotive unit, fluid under pressure from the main reservoir 15 on that unit will flow by way of the respective pipe 17 and the choke or chokes 80 to the pipe or pipes 19 on such unit. Fluid under pressure thus supplied to the pipe or pipes 19 will flow to the control chambers 59 in the relay valve devices 55 and 56 connected to thereto. Fluid under pressure thus supplied to the control chambers in the relay valve devices 55 will cause same to establish fluid pressure connection between their inlet and outlet chambers 63 and 64 and thereby connect the pipe 17 to the pipe or pipes 19 on each unit, as will be appreciated from previous description of such devices, while fluid under pressure supplied to the corresponding control chambers in the relay valve devices 56 will cause same to establish connection between the pipe 11a and the pipe or pipes 11b on each unit.

Communication between the reservoirs 15 on the various units thus is established by way of the pipes 17, relay valve devices 55, pipes 19, and couplings 20 so that in event of failure of a compressor on a particular unit, the main reservoir 15 on that unit may be maintained charged by fluid under pressure supplied to the main reservoir 15 on another unit by its compressor, since all main reservoirs are in communication one with the other.

Communication between the pipes 11a on the various units is established by way of the relay valve devices 56, the pipes 11b and the couplings 12 so that fluid under pressure supplied to the pipe 11a by the control valve device 13 on the leading control unit will be received by the corresponding pipe 11a on the other locomotive units to operate the dynamic brake control actuators 10 on all units simultaneously for effecting dynamic braking of the locomotive, as will be appreciated from previous description in regard to operation of the apparatus shown in Fig. 1.

Now assume that break-in-two occurs either between the leading control unit and the slave unit or between such slave unit and the trailing control unit with resultant parting of the couplings 12 and 20 at the line of break-in-two.

Upon parting of the coupling 12 at the point of break-in-two, the respective pipes 11b on the separated locomotive units become vented at the parted coupling.

Similarly, upon parting of the coupling 20 at the point of break-in-two, the respective pipes 19 connected to the parted coupling 20 on the separated locomotive units become vented via such parted coupling, whereupon fluid under pressure from the control chambers 59 of the relay valve devices 55, 56 at the separated ends of said units will vent to atmosphere via such pipes 19.

With such venting of their respective control chambers 59, the relay valve devices 55 at the separated ends of the units will respond to close their respective valves 66 to prevent unrestricted communication between the respective reservoir pipes 17, hence the main reservoirs 15 on the separated units, and the respective pipes 19 assumed to be vented via the parted coupling 20, so that only a relatively small amount of fluid under pressure from these reservoirs will leak to atmosphere via said pipes 17, the chokes 80 which by-pass said relay valve devices, said pipes 19 and said coupling 20; which small amount of leakage may be maintained with ease by the respective compressors on said separated units.

With venting of the respective control chambers 59 in the relay valve devices 56 by way of the pipes 19 at the separated ends of the units, such devices will respond to close their respective valves 66 to close communication between the respective pipes 11a and the pipes 11b on said separated units so that any fluid under pressure supplied to or existing in said pipes 11a for operating the dynamic brake control actuators 10 will not escape to atmosphere via the parted coupling 12 to which said pipes 11b are connected, in keeping with the object of the invention.

At whichever end of the slave unit remaining coupled to one or the other of the control units, the hose couplings 12 and 20 will remain intact with the respective control chambers 59 in the relay valve devices 55, 56 at the coupled ends of slave and control units remaining charged with fluid under pressure via the pipes 19 at such ends. Via communications in these relay valve devices 55, 56 established by virtue of their pressurized control chambers, the main reservoirs 15 and pipes 11a on the coupled slave and control units will remain connected one with the other to assure control of dynamic braking on said units, as will be appreciated from previous description.

By virtue of the small quantity of fluid under pressure which is allowed to leak past the relay valve devices 55 at the separated ends of two locomotive units by way of the respective chokes 80 into the pipes 19, the control chambers in the relay valve devices 55, 56 connected to such pipe may again be availed of fluid under pressure upon re-coupling of parted couplings 20 and 12 to again connect the respective pipes 17 and 11a on said units one with the other for normal control of dynamic braking on the re-coupled units.

*Summary*

It will now be seen that in keeping with the objects of the invention, I have provided safety control apparatus for assuring control of dynamic braking on the units of a multiple-unit Diesel-electric locomotive in event of accidental separation of such units.

Having now described the invention, what I claim as new and desire to secure by Letters Patent, is:

1. Safety control apparatus for a multiple unit locomotive, comprising a fluid pressure brake control pipe having sections extending from end to end through the locomotive units, respectively, hose pipe coupling means extending between each adjacent pair of said units and connecting together the sections of said brake control pipe on the respective units, a source of electrical energy, a magnet valve device on a certain locomotive unit having a valve portion controlling communication between the respective brake control pipe section and the respective hose pipe coupling means, said magnet valve device also having a solenoid portion energizable and deenergizable to operate said valve portion to establish and disestablish, respectively, said communication, and a loop circuit means including, in series with said source of electrical energy and with said solenoid portion of said magnet valve device, a pair of wire couplings extending between said certain locomotive unit and the adjacent locomotive unit and connected together electrically on said adjacent locomotive unit.

2. Safety control apparatus for a multiple-unit locomotive, comprising a fluid pressure brake control pipe having sections extending from end to end through the locomotive units, respectively, hose pipe coupling means extending between each adjacent pair of units and connecting together the brake control pipe sections on the respective units, a source of electrical energy on a certain locomotive unit, a magnet valve device on said certain locomotive unit having a valve portion controlling communication between the respective brake control pipe section and the respective hose pipe coupling means and also having a solenoid portion energizable and deenergizable to operate said valve portion to establish and disestablish, respectively, said communication, and a loop circuit means including, in series with said solenoid portion of said magnet valve device and with said source of electrical energy, a pair of wire couplings extending between said certain locomotive unit and the adjacent locomotive unit, and conductor means on said adjacent locomotive unit electrically connecting the respective ends of said wire couplings one with the other.

3. Safety control apparatus for a multiple-unit locomotive having a control unit and a slave unit, said apparatus comprising a fluid pressure brake control pipe having sections extending from end to end through the locomotive units, respectively, a hose pipe coupling extending between said control unit and said slave unit and connecting together the brake control pipe sections on the two locomotive units, a battery on said control unit, a magnet valve device on said control unit having valve means controlling communication between the brake control pipe section on said control unit and said hose pipe coupling and also having a solenoid portion energizable and deenergizable to operate the respective valve means to establish and disestablish said communication, a magnet valve device on said slave unit having valve means controlling a second communication between the brake control pipe section on said slave unit and said hose pipe coupling and also having a solenoid portion energizable and deenergizable to operate the respective valve means to establish and disestablish, respectively, the respective communication, a first loop circuit means including, in series with said battery and with the solenoid portion of the magnet valve device on said control unit, a pair of wire couplings extending between said control unit and said slave unit and conductor means on said slave unit electrically connecting the respective ends of said wire couplings one with the other, and a second loop circuit means including, in series with said battery and with the solenoid portion of the magnet valve device on said slave unit, a pair of wire couplings extending between the two locomotive units.

4. Safety control apparatus for a multiple-unit locomotive having two control units and an intermediate slave unit, said apparatus comprising a fluid pressure brake control pipe having sections extending from end to end through the locomotive units, respectively, hose pipe couplings exteding between opposite ends of said slave unit and the adjacent ends of said two control units, a plurality of magnet valve devices, one at each of the adjacent ends of the locomotive units, each of said magnet valve devices being energizable to establish a local fluid pressure communication between the respective brake control pipe section and the respective hose pipe coupling and deenergizable to disestablish said local fluid pressure communication, two batteries, one on each of said control units, an electrical source wire connected at opposite ends to the positive terminals of said batteries, respectively, and extending through the locomotive via wire couplers between the locomotive units, a ground wire connected at opposite ends to the negative terminals of said batteries, respectively, and extending through the locomotive via wire couplers between the locomotive units, a wire for each of said magnet valve devices connecting one terminal thereof to said ground wire locally on the respective locomotive unit, and conductors means for each of said magnet valve devices including a wire coupler extending between adjacent locomotive units and connecting the opposite terminal of each of said magnet valve devices to said source wire on the immediately adjacent locomotive unit.

References Cited in the file of this patent

UNITED STATES PATENTS

| | | |
|---|---|---|
| 1,703,896 | Parke | Mar. 5, 1929 |
| 2,112,427 | Sexton | Mar. 29, 1938 |
| 2,379,308 | McClure | June 26, 1945 |
| 2,464,968 | Erson | Mar. 22, 1949 |
| 2,575,958 | Hines | Nov. 20, 1951 |